(12) United States Patent
Griffin, Jr. et al.

(10) Patent No.: US 10,281,053 B2
(45) Date of Patent: May 7, 2019

(54) LATTICE STRUCTURE VALVE/REGULATOR BODY

(71) Applicant: EMERSON PROCESS MANAGEMENT REGULATOR TECHNOLOGIES, INC., McKinney, TX (US)

(72) Inventors: James L. Griffin, Jr., McKinney, TX (US); William E. Wears, Marshalltown, IA (US); Bryan J. Penkal, Troy, OH (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 21 days.

(21) Appl. No.: 15/288,855

(22) Filed: Oct. 7, 2016

(65) Prior Publication Data
US 2017/0102089 A1      Apr. 13, 2017

Related U.S. Application Data

(60) Provisional application No. 62/240,444, filed on Oct. 12, 2015.

(51) Int. Cl.
*B33Y 10/00* (2015.01)
*F16K 27/10* (2006.01)
(Continued)

(52) U.S. Cl.
CPC .......... *F16K 27/102* (2013.01); *B22F 3/1055* (2013.01); *B22F 3/1115* (2013.01);
(Continued)

(58) Field of Classification Search
CPC ......... B33Y 10/00; B33Y 30/00; B33Y 80/00; B22F 3/1115; B22F 3/1118; B22F 3/1055;
(Continued)

(56) References Cited

U.S. PATENT DOCUMENTS 2,887,295 A * 5/1959 Bredtschneider ......... F16K 1/42
                                                          251/359
3,505,793 A * 4/1970 Haskins ................. B01D 46/10
                                                          137/550

(Continued)

FOREIGN PATENT DOCUMENTS

WO     WO-2015/142861        9/2015

OTHER PUBLICATIONS

International Search Report and Written Opinion, for Application No. PCT/US2016/056488, dated Jan. 19, 2017.

*Primary Examiner* — Ian G Paquette
(74) *Attorney, Agent, or Firm* — Marshall, Gerstein & Borun LLP

(57) ABSTRACT

A method of manufacturing a body of a fluid control apparatus using additive manufacturing, the method including forming an inner wall having an outside surface and an inside surface, an area surrounding an inlet, an area surrounding an outlet, and an area surrounding a fluid flow path, wherein the inner wall provides a fluid boundary and connects the inlet and the outlet. The method further including forming a portion of the inner wall that receives a valve seat, forming a portion of the inner wall that receives a control stem and a control element, and forming a lattice structure by depositing a solidifiable material onto the inner wall in a predetermined pattern, wherein the lattice structure is three-dimensional and includes a plurality of connected lattice members.

18 Claims, 7 Drawing Sheets

(51) Int. Cl.
*F16K 27/12* (2006.01)
*F16K 27/02* (2006.01)
*B33Y 30/00* (2015.01)
*B33Y 80/00* (2015.01)
*B23P 15/00* (2006.01)
*B22F 3/105* (2006.01)
*B22F 3/11* (2006.01)
*B22F 7/06* (2006.01)
*B22F 7/08* (2006.01)

(52) U.S. Cl.
CPC ............ *B22F 3/1118* (2013.01); *B22F 7/062* (2013.01); *B22F 7/08* (2013.01); *B23P 15/001* (2013.01); *B33Y 10/00* (2014.12); *B33Y 30/00* (2014.12); *B33Y 80/00* (2014.12); *F16K 27/02* (2013.01); *F16K 27/0272* (2013.01); *F16K 27/12* (2013.01); *Y02P 10/295* (2015.11)

(58) Field of Classification Search
CPC .......... B22F 7/062; B22F 7/08; B23P 15/001; Y02P 10/295; F16K 27/00; F16K 27/02; F16K 27/0272; F16K 27/12; F16K 27/102

USPC ......... 29/890.12, 890.124, 890.131, 890.132
See application file for complete search history.

(56) References Cited

U.S. PATENT DOCUMENTS

| | | | | |
|---|---|---|---|---|
| 3,685,547 | A * | 8/1972 | Tuppeny, Jr. | F16K 27/00 138/178 |
| 4,007,908 | A * | 2/1977 | Smagghe | F16K 47/08 138/40 |
| 4,506,865 | A * | 3/1985 | Bragin | B65G 53/523 251/326 |
| 4,688,601 | A | 8/1987 | Astill | |
| 5,540,415 | A * | 7/1996 | Yamamoto | F16K 1/10 251/118 |
| 9,759,348 | B2 * | 9/2017 | Adams | F16K 47/08 |
| 2009/0183790 | A1 | 7/2009 | Moore | |
| 2015/0345304 | A1 * | 12/2015 | Mongillo | F01D 5/187 416/97 R |
| 2016/0290529 | A1 * | 10/2016 | Hart | F16K 5/08 |
| 2017/0184086 | A1 * | 6/2017 | Scancarello | F04B 39/0284 |

* cited by examiner

LATTICE STRUCTURE VALVE/REGULATOR BODY

FIELD OF THE INVENTION

The present disclosure relates to manufacturing a body of a fluid regulator or a control valve, more specifically, manufacturing a body using additive manufacturing.

BACKGROUND

Conventional manufacturing processes and techniques for manufacturing body components of fluid regulators and control valves place design and material restrictions on the body components. Die casting, or similar suitable methods, present certain obstacles in manufacturing body components, and those obstacles are usually overcome at the expense of the design of the body component. For example, a designer of a valve body is faced with the problem of getting molten metal to flow in the casting for the desired shape and thickness of the body. In resolving the issues inherent in die casting, the designer is limited to a body design that can actually and easily be manufactured using known methods. Current manufacturing methods require additional finishing processes, adding to the costs of labor and materials.

Limited to conventional methods of manufacturing, a typical regulator body or valve body is made of a single material at a uniform density. To meet certain strength requirements, the body wall is often given a certain thickness to provide the strength required by the control system to sustain highly pressurized fluids. Thus, regulator and valve bodies are often heavy and provide strength by increasing the thickness of the body wall.

A typical valve regulator 10, as illustrated in FIG. 1, regulates the fluid pressure and/or flow to maintain a selected output pressure, and is generally well known in the art. The fluid regulator 10 includes a regulator body 12, a control element 14, and an actuator assembly 16. The regulator body 12 defines a fluid flow path 18 that extends from a fluid inlet 20 to a fluid outlet 22. The fluid regulator 10 includes an orifice 24 disposed in the fluid flow path 18 and leading to a valve seat 26. The control element 14 is disposed within the fluid flow 18 path and is shiftable between an open position (as shown in FIG. 1) in which the control element 14 is spaced away from the valve seat 26, and a closed position in which the control element 14 is seated against the valve seat 26. The actuator assembly 16 is attached to or otherwise operatively coupled to the control element 14 and is arranged to respond to fluid pressure changes in the outlet 22 and to move the control element 14 between the open position and the closed position in order to control the flow of the process fluid through the orifice 24. The actuator assembly 16 may be conventional and may include a diaphragm assembly 28, load springs 30, and a suitable stem 32 or other suitable linkage. The actuator assembly and diaphragm assembly are enclosed in a housing 34 which is attached to the regulator body 12.

An inner wall 36 of the regulator body 12 provides an area 38 surrounding the inlet 20, an area 40 surrounding the outlet 22, a portion 42 defining the fluid flow path 18, an area 43 surrounding a cylindrical bore 44 to receive the control element 14, and a portion 46 to receive the valve seat 26. The inner wall 36 of the conventional fluid regulator 10, such as the one depicted in FIG. 1, provides a uniform density of a single material, typically metal or plastic, including brass, bronze, cast iron, steel, alloy steels, and stainless steels, or other suitable materials.

Accordingly, it may be desirable to provide a method of manufacturing a body for fluid regulators and control valves where the manufacturing process is driven by design, rather than the design of the body being driven by the manufacturing process. Manufacturing a valve body or a regulator body that may be light, stable, and capable of withstanding pressure of a typical valve body or regulator body is also desirable.

SUMMARY

In accordance with one or more exemplary aspects, a valve and/or regulator body assembled in accordance with the teachings disclosed herein may address the limitations of current manufacturing processes by utilizing Additive Manufacturing (AM), Laser-Sintering, and/or three-dimensional printing for designing and manufacturing valve and regulator bodies. AM eliminates the restrictions placed on design by conventional manufacturing practices, and allows manufacturing and design of a regulator or valve body including one or more different materials, varying densities, and other material parameters based on the requirements of the body.

In accordance with a first exemplary aspect, a method of manufacturing a body of a fluid control apparatus using additive manufacturing is disclosed herein. The method includes forming an inner wall having an outside surface and an inside surface, an area surrounding an inlet, an area surrounding an outlet, and an area surrounding a fluid flow path, wherein the inner wall provides a fluid boundary and connects the inlet and the outlet; forming a portion of the inner wall that receives a valve seat; forming a portion of the inner wall that receives a control stem and a control element; forming a lattice structure by depositing a solidifiable material onto the inner wall in a predetermined pattern, wherein the lattice structure is three-dimensional and includes a plurality of connected lattice members.

In accordance with a second exemplary aspect, a method of manufacturing a body of a fluid control apparatus, the method including: forming an inner wall having an inside surface and an outside surface; forming a portion of the inner wall arranged to receive a valve seat; forming a first flange surrounding an inlet, a second flange surrounding an outlet, and a portion surrounding a fluid flow path connecting the inlet and the outlet; forming a portion of the inner wall surrounding a bore that receives a control element and a valve stem; and forming a lattice structure having a plurality of connected lattice members, wherein the lattice structure is attached to the inner wall.

In accordance with a third exemplary aspect, a body of a fluid control apparatus, the body comprising: an inner wall of a first density including an outside surface, an inside surface, an area surrounding a bore sized to receive a control stem and a control element, an area sized to receive a valve seat, a first flange surrounding an inlet, a second flange surrounding an outlet, and an area defining a fluid flow path connecting the inlet and the outlet; and a lattice structure of a second density attached to the inner wall. Further including the step of providing a housing arranged to receive an actuator assembly and a diaphragm assembly, wherein the housing is configured to attach to the inner wall.

In further accordance with any one or more of the foregoing first, second, or third aspects, a body and/or method may further include any one or more of the following preferred forms. In a preferred form, the method includes depositing the solidifiable material directly onto the inside surface of the inner wall.

In a preferred form, the method of includes depositing the solidifable material directly onto the outside surface of the inner wall.

In a preferred form, the method includes forming a hollow space between the outside surface and the inside surface of the inner wall.

In a preferred form, the method includes depositing a solidifiable material onto the inner wall within the hollow space.

In a preferred form, the method includes the step of depositing the solidifiable material to form the lattice structure and a shell, wherein the lattice structure is disposed within the shell.

In a preferred form, the method includes forming the lattice structure on a receiving surface, removing the lattice structure from the receiving surface, and attaching the lattice structure to the inner wall.

In a preferred form, the method includes additive manufacturing the inner wall and the lattice structure together by depositing a solidifiable material in a predetermined pattern to create a three-dimensional integrated body.

In a preferred form, the method includes manufacturing the lattice structure and attaching the lattice structure to the inside surface of the inner wall to modify the fluid flow path.

In a preferred form, the method includes manufacturing the lattice structure and attaching the lattice structure to the outside surface of the inner wall.

In a preferred form, the method further including the step of identifying a material property requirement of a localized area of the inner wall, and providing the lattice structure to the localized area, wherein the lattice structure includes the material property requirement of the localized area.

In a preferred form, the method further including the step of providing the lattice structure to the localized area wherein the localized area requires a low material strength requirement.

In a preferred form, the method of claims further including the step of reinforcing the lattice structure by providing at least one link between at least two of the plurality of lattice members.

In a preferred form, the method includes the step of disposing the plurality of lattice members at a predetermined distance to achieve a predetermined density of the lattice structure.

In a preferred form, the method further including forming a non-uniform lattice structure density by disposing the plurality of lattice structure members are varying distances.

In a preferred form, the method includes connecting the plurality of lattice members at a predetermined distance to achieve a predetermined density of the lattice structure.

In a preferred form, the method further including the step of providing a nonporous material for the inner wall and a porous material for the lattice structure.

In a preferred form, the method further including the step of providing a gel, gas, or fluid disposed within the lattice structure for insulation.

In a preferred form, the method further including the step of providing a sensor disposed within the lattice structure for sensing changes in flow characteristics.

In a preferred form of the body, the lattice structure and the inner wall are integrally attached.

In a preferred form of the body, the lattice structure is attached to the inside surface of the inner wall.

In a preferred form of the body, the lattice structure is attached to the outside surface of the inner wall.

In a preferred form of the body, the inner wall is a shell having a hollow space and the lattice structure is attached to the shell within the hollow space.

In a preferred form of the body, the second density of the lattice structure varies by varying the distance between connected lattice members of the plurality of connected lattice members.

In a preferred form of the body, the lattice structure is a first material and the inner wall is a second material.

In a preferred form of the body, the lattice structure includes at least one link connecting at least two of the plurality of lattice members.

In a preferred form of the body, the lattice structure has variable strength by varying a thickness of the link.

In a preferred form of the body, the lattice structure is attached to the inner wall by welding.

In a preferred form, the body further includes a sensor, gel, or inert gas disposed within the lattice structure.

DETAILED DESCRIPTION

Turning now to specific examples of the drawings, FIGS. 2-4B illustrate a method and an apparatus for manufacturing a regulator body or a valve body by one or more of Additive Manufacturing (AM), Laser-Sintering, stereolithography, and/or industrial three-dimensional printing.

Figure 1:
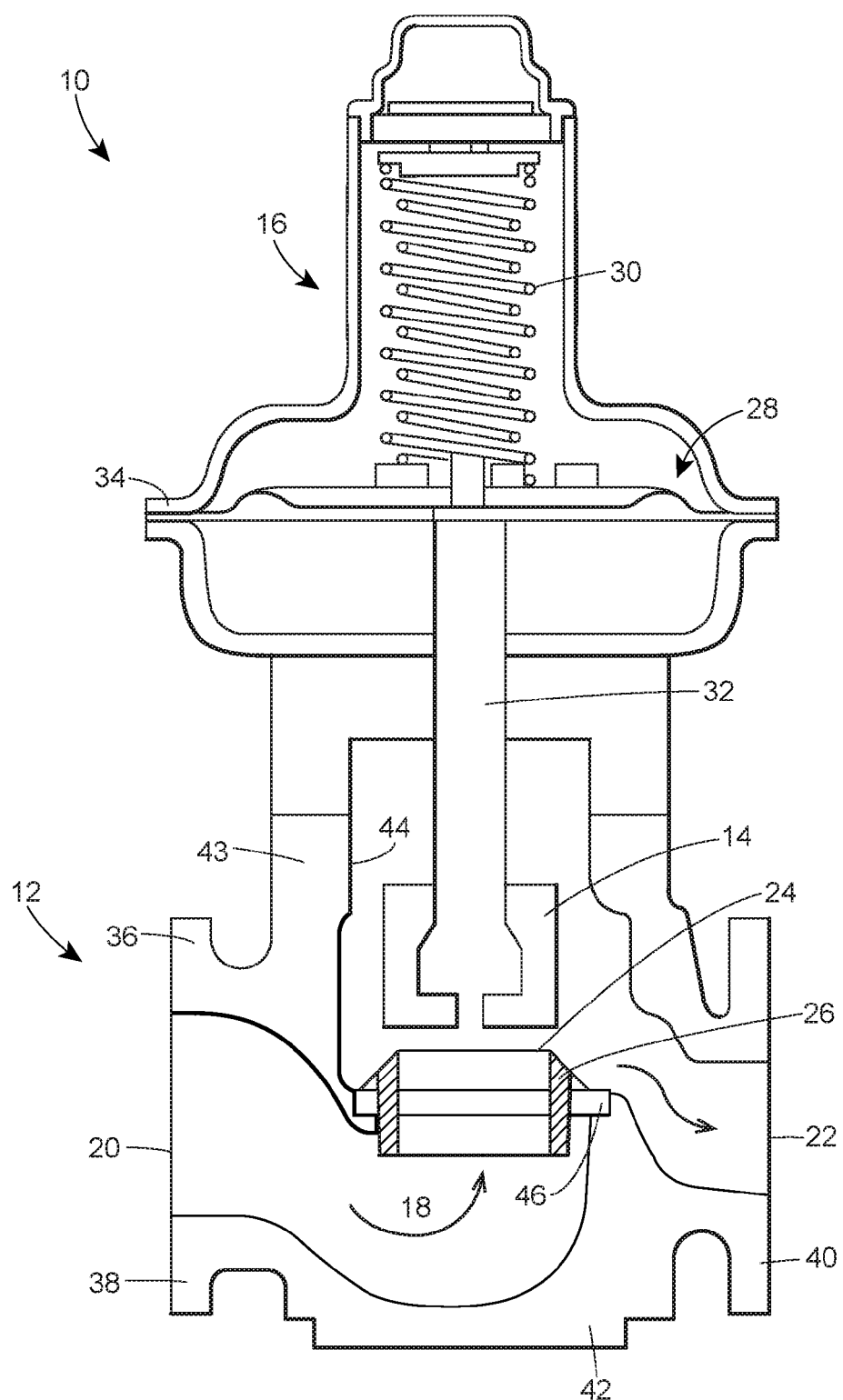
FIG. 1 illustrates a cross-sectional view of a known fluid regulator.
Figure 2:
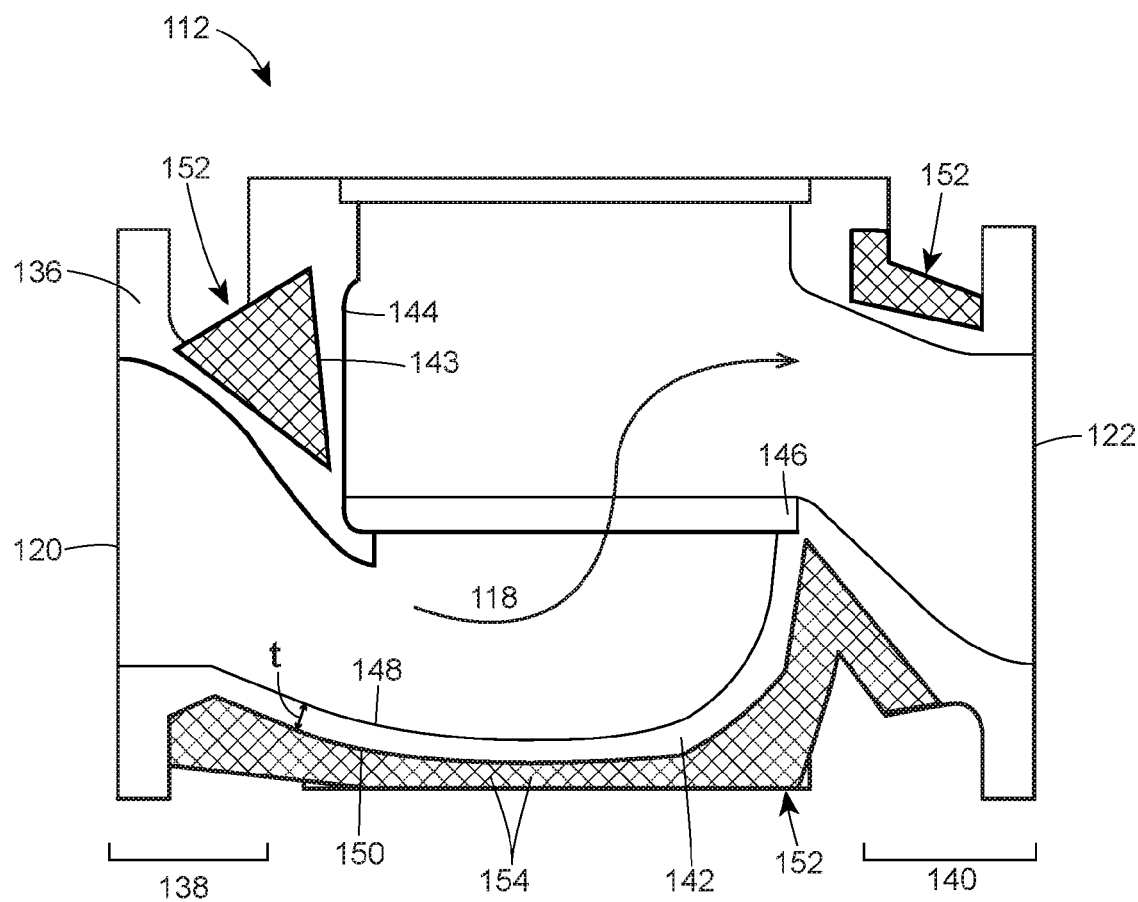
FIG. 2 illustrates a cross-sectional view of a regulator or valve body and lattice structure assembled in accordance with the teachings of a first exemplary arrangement of the present disclosure.

Referring now to FIG. 2, a body 112 for a fluid regulator or a control valve may be at least partially manufactured by AM. The body 112 may replace the body 12 of the fluid regulator 10 of FIG. 1 or a body of a control valve. The body 112 includes an inner wall 136 including an area 138 surrounding a fluid inlet 120, which may include a first flange, an area 140 surrounding a fluid outlet 122, which may include a second flange, and an area 142 defining a fluid flow path 118 that connects the inlet 120 and the outlet 122. The inner wall 136 includes an area 143 surrounding a cylindrical bore 144 that is sized to receive a control stem and a control element. The inner wall 136 may include an area 146 sized to receive a valve seat that is disposed between the inlet 120 and the outlet 122 within the flow path 118. The inner wall 136 includes an inside surface 148 and an outside surface 150.

The body of FIG. 2 includes at least one lattice structure 152 including a plurality of connected lattice members 154 formed by AM or other suitable methods. The lattice structure 152 and the inner wall 136 may be integrally attached. The lattice structure 152 is attached to the outside surface 150 of the inner wall 136 at the area 138 surrounding the inlet 120, the area 140 surrounding the outlet 122, the area 142 defining the fluid flow path 118, and at least part of the area 143 surrounding the bore 144. The lattice structure 152 may be porous having a density that differs from the density of the inner wall 136. As described in more detail below, the lattice structure 152 is made of a plurality of connected lattice members 154 arranged in connected lattice cell units to form a three-dimensional structure. Air pockets may be formed between the lattice members 154, providing a lighter and less dense body 112. Due to the structural similarities of FIGS. 2-6, only new components will be given new reference numbers.

The body 112 of FIG. 2 may be designed specifically to suit the needs of the fluid control apparatus or system for which it is made. The lattice structure 152 illustrated in FIG. 2 is attached to the outside surface 150 of the inner wall 136 to provide support for the inner wall 136 and to reduce the weight of the body 112. In this example, the lattice structure 152 is disposed on the outside surface 150 of the inner wall 136 so that the process fluid does not interact with the lattice structure 152. The inner wall 136 may provide a non-permeable barrier between the outside surface 150 of the inner wall 136 and the process fluid. In case of a leak in the inner wall 136, the lattice structure 152 may be equipped with a sensor that may detect a leak, break, or vibrations in the inner wall 136.

Focusing now on the area 142 of the inner wall 136 that surrounds the fluid flow path 118, the inner wall 136 has a thickness t that is less than a thickness of the inner wall 36 of the body 12 of FIG. 1. The lattice structure 152 may add to the overall thickness of the body 112, but the thickness of the solid, nonporous inner wall 136 is reduced, thereby reducing the overall weight of the body 112. Although the lattice structure 152 may be less dense and may be porous, the structure 152 may be designed to provide structural support specifically for the area of the inner wall 136 to which it is attached. The lattice structure 152 may be manufactured by AM integrally with or separately from the inner wall 136 of the body 112. Preferably, the lattice structure 152 and the inner wall 136 of the body 112 are designed together as a three-dimensional model and then manufactured as a single body 112 by AM, or more specifically, direct metal laser sintering (DMLS). The lattice structure 152 of FIG. 3 may be the same or different material than the inner wall 136 and may be the same or different density than the inner wall 136. The lattice structure 152 may be attached to the inner wall 136 by welding, bonding, or by other means.

Figure 3:
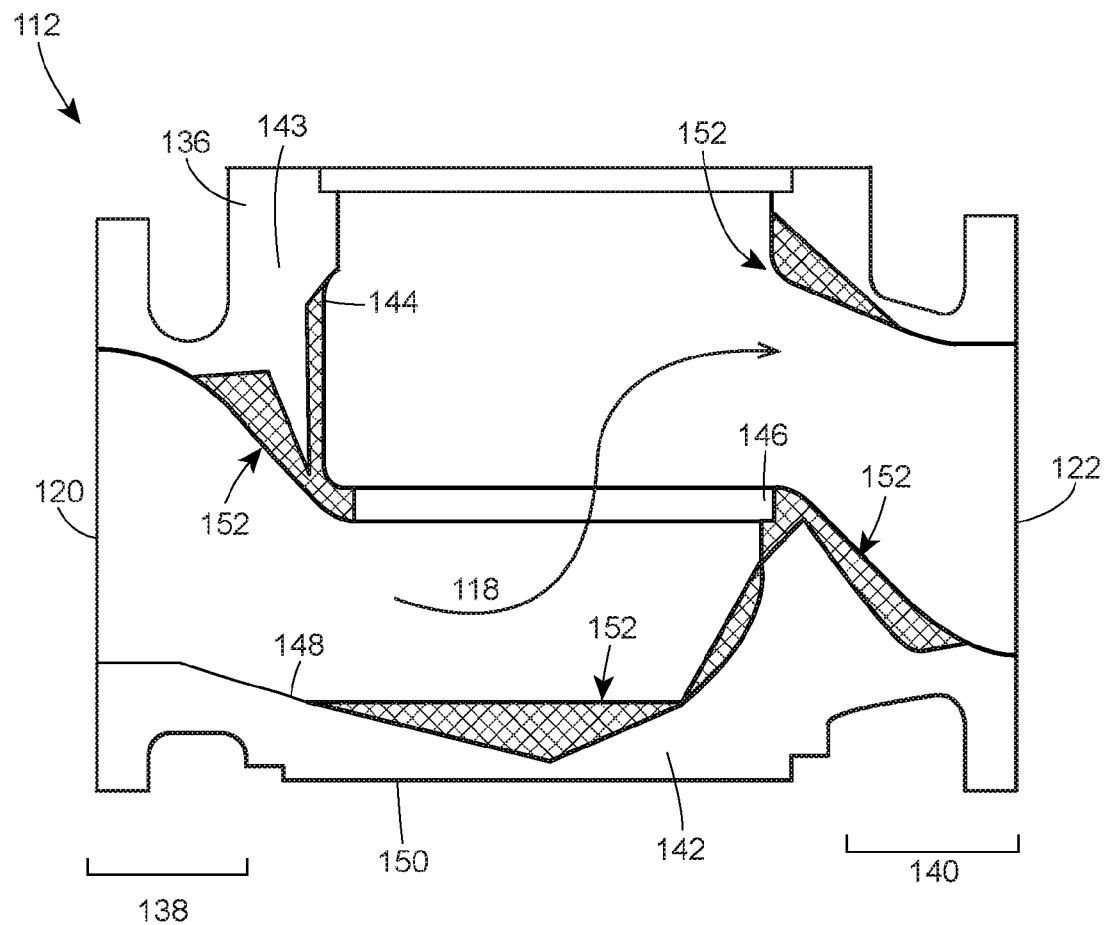
FIG. 3 illustrates a cross-sectional view of a regulator or valve body and lattice structure assembled in accordance with the teachings of a second exemplary arrangement of the present disclosure.

Turning now to FIG. 3, at least one lattice structure 152 is attached to the inside surface 148 of the inner wall 136 and the outside surface 150 of the inner wall 136 may be non-porous and uniform. The lattice structure 152, due to its porosity, may be attached or formed directly on the inside surface 148 of the inner wall 136 to modify the fluid flow path 118, and therefore, modify the flow of the process fluid through the body 112. For example, process fluid may be free to flow within the space and/or air pockets of the lattice structure 152, which may redirect or diffuse the flow of the process fluid through the body 112. Similar to the body 112 of FIG. 2, the body 112 of FIG. 3 may be lighter in weight and may provide a non-uniform density than the conventional body 12 of FIG. 1. The area 138 surrounding the inlet 120, the area 142 defining the fluid flow path 118, the area 143 surrounding bore 144, and the area 146 shaped to receive a valve seat are at least partially formed by the lattice structure 152. The area in which the lattice structure 152 replaces the inner wall 136 may be determined by conducting a finite element analysis as described in further detail below. The lattice structure 152 disposed on the inside surface 148 of the inner wall 136 may be arranged such that the flow of the process fluid is a function of the structure and connections of the lattice members.

Figure 4A:
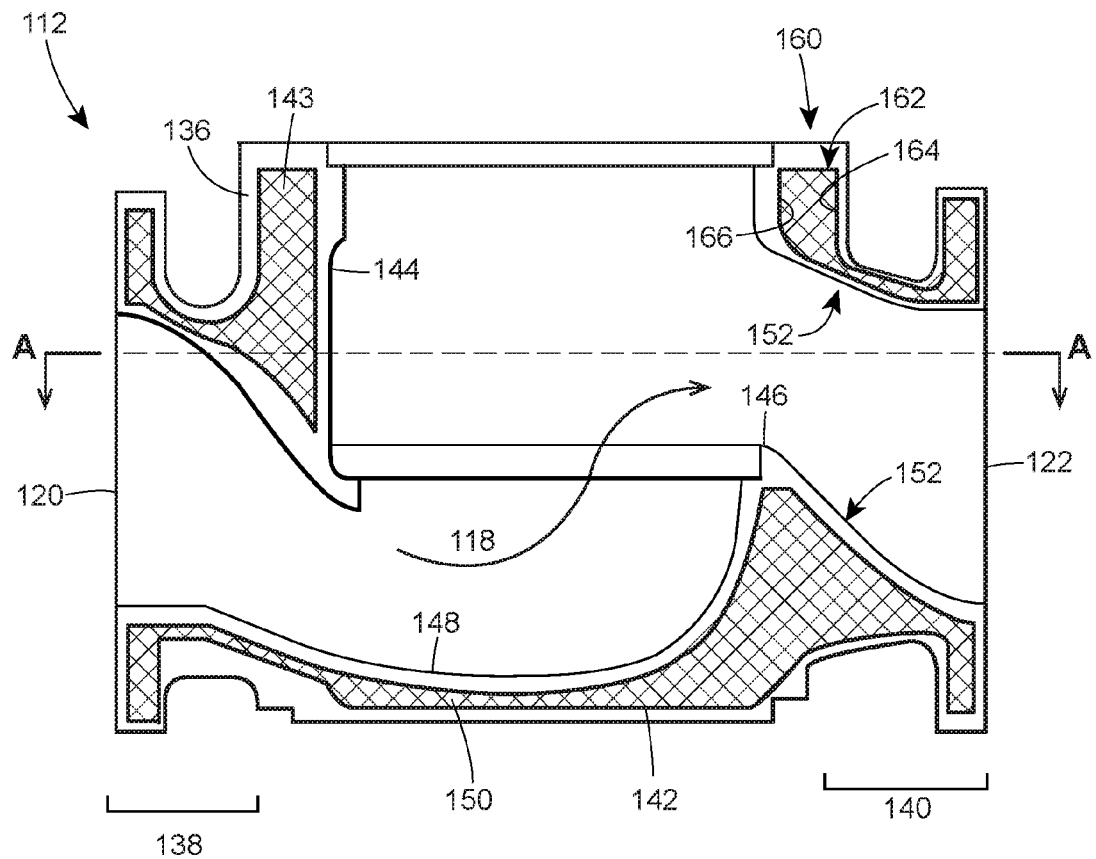
FIG. 4A illustrates a cross-sectional view of a regulator or valve body and lattice structure assembled in accordance with the teachings of a third exemplary arrangement.
Figure 4B:
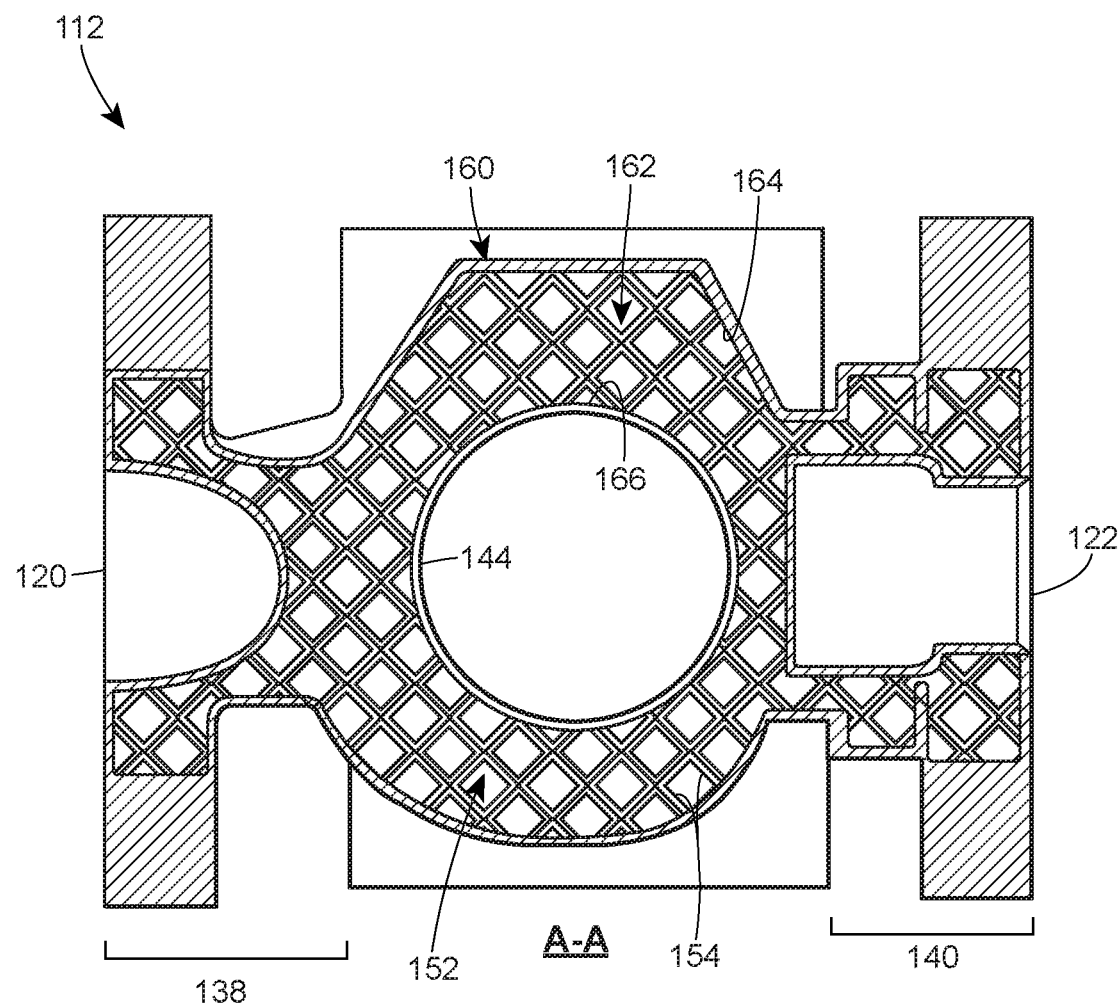
FIG. 4B illustrates a top, cross-sectional view of the body and lattice structure of FIG. 4A.

FIGS. 4A and 4B illustrate a third exemplary body 112 wherein the inner wall 136 is a hollow shell 160 having a hollow space 162 between a first inside surface 164 of the shell 160 and a second inside surface 166 of the shell 160. The lattice structure 152 is disposed or otherwise attached within the hollow area 162 to the first inside surface 164 and the second inside surface 166 of the shell 160. FIG. 4B illustrates a top view of cross-section A-A of FIG. 4A. The lattice structure 152 may be disposed throughout the inner wall 136 of the body 112, but remains insulated by the outside and inside surfaces 150, 148 of the inner wall 136. In this case, the body is much lighter in weight than the conventional body 12 of FIG. 1. The lattice structure 152 may vary in density throughout the body 112 to add structural support, distribute stress, and add strength to certain areas of the body 112. The lattice structure 152 may be made separately and then placed within the hollow space 162 of the shell 160, or the lattice structure 152 may be directly formed on the inner wall 136 by AM, i.e. deposited by successive layers of solidifiable materials.

Figure 5:
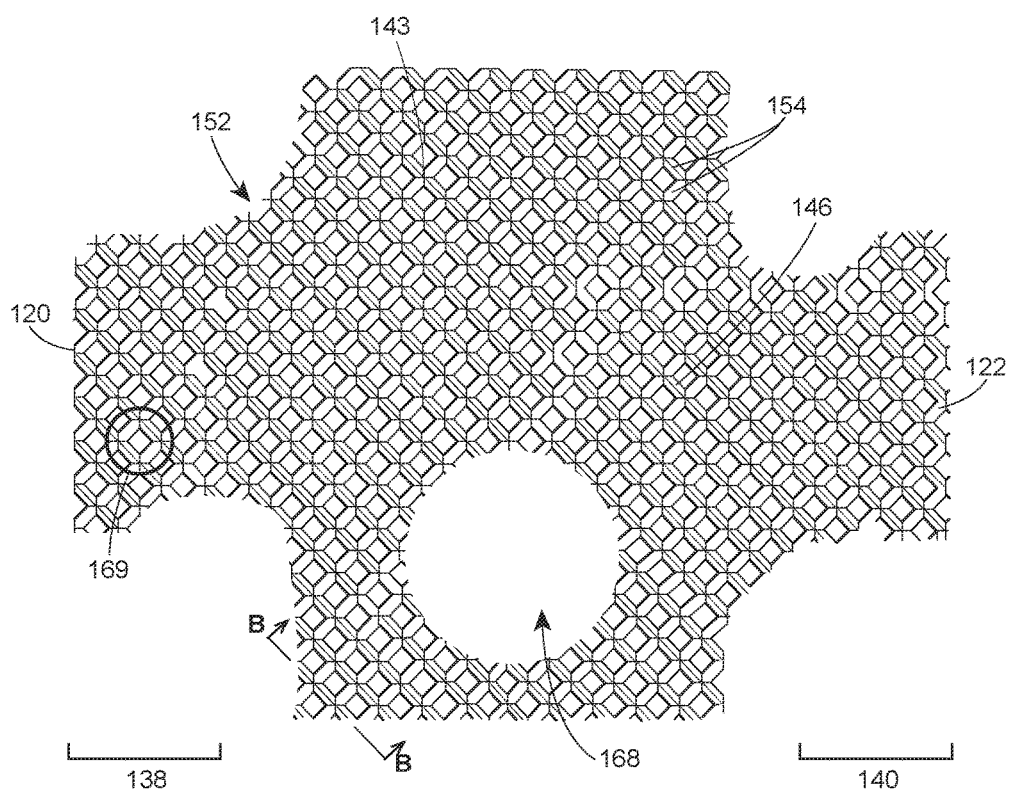
FIG. 5 illustrates a front view of the lattice structure of FIGS. 4A and 4B.

FIG. 5 illustrates a front view of the lattice structure 152 of FIGS. 4A and 4B without the shell 160 of the body 112. The lattice structure 152 in FIG. 5 is uniform, but may be designed having a non-uniform density where some areas of the lattice structure 152 provide highly concentrated lattice cell units, i.e. more connected lattice members 154, or may provide thicker lattice members 154 in certain areas to strengthen weaker areas of the body 112. The lattice structure 152 may replace parts of the body 112 as shown in FIGS. 2-3, or the lattice structure 152 may substantially form the inner wall 136, including the area 138 surrounding the inlet 120, the area 140 surrounding the outlet 122, the area 142 defining the fluid flow path 118, the area 143 surrounding the bore 144, and other parts of the body 112. The shape of the lattice structure 152 may be designed to form a structure of any regulator or valve body, and is not limited to the lattice structure 152 of FIG. 5. In a preferable arrangement, the shell 160 and the lattice structure 152 are manufacturing using DMLS where a hole 168 is formed in the shell 160 and the lattice structure 152 so that excess powder used in the process may be removed. The hole 168 would then be sealed with a weld or a fitting. The hole may be a conduit for introducing a gel, gas, or a liquid into the body. In contrast, the body 112 of FIG. 3 may not require a hole to be formed during the manufacturing process because the excess powder from manufacturing may easily be removed from the bore 144, the inlet 120, or the outlet 122.

Turning now to FIG. 5 and FIGS. 6A-6C, the lattice members 154 are interconnected to form the lattice structure 152 as illustrated herein. The plurality of lattice members 154 form a pattern of connected lattice unit cells 169 that may repeat a certain pattern to provide the overall lattice structure 152. In the illustrated example, the lattice unit cell 169 is a cubic cell where at least twelve lattice members are connected in a three-dimensional space. Each lattice member 154 is connected to another lattice member 154 at a 90 degree angle, and each member is spaced apart from a similarly situated parallel lattice member 154 a predetermined distance apart. Cross-section B-B of the uniform lattice structure 152 of FIG. 5 is similar, or substantially similar, to a cross-section that is orthogonal to B-B. In other words, the cubic lattice cell 169 is uniform throughout the lattice structure 152, providing parallel lattice members 154 connected to perpendicular lattice members 154 in three-dimensions. At any point, the lattice cell unit 169 remains the same or substantially the same.

FIG. 5 is merely an example of a three-dimensional lattice structure 152, and the lattice structure 152 described herein may be any one of a variety of combinations of connected lattice members 154. For example, the lattice members 154 may be connected at varying angles, spaced apart at varying distances, and may include different lengths and thicknesses. The entire structure 152 may be uniform as illustrated in FIG. 5, or the lattice structure 152 may be non-uniform, with specific densities at a predetermined localized areas of the body 112. In some examples, the lattice cell units 169 may vary in density, forming a lattice structure 152 having a non-uniform density. The density of the lattice structure 152 may vary by varying a distance between connected lattice members 154. The lattice structure 152 may provide strength where needed by reducing the distance between members 154 and may reduce weight where strength is not needed by increasing the distance between members 154.

Figure 6A:
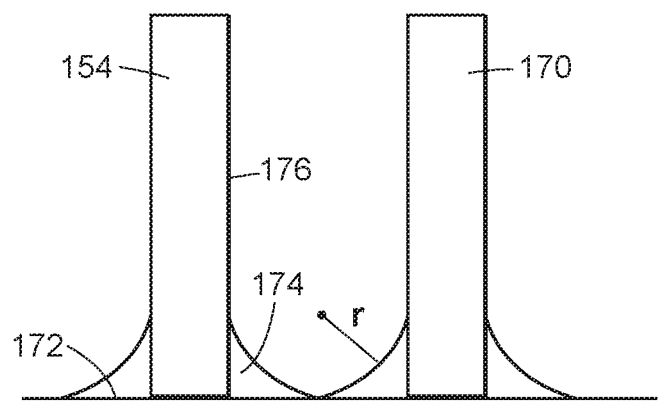
FIG. 6A is an enlarged fragmentary cross-sectional view illustrating a first exemplary arrangement of two lattice members of a lattice structure assembled in accordance with the teachings described herein.
Figure 6B:
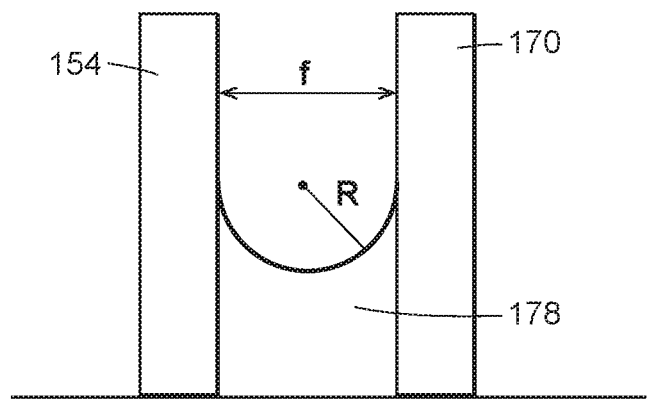
FIG. 6B illustrates an enlarged fragmentary cross-sectional view illustrating a second exemplary arrangement of two lattice members of a lattice structure assembled in accordance with the teachings described herein.

Section B-B of FIG. 5 is partially illustrated in FIG. 6A, depicting a cross-section of a partial lattice cell unit 169 in a two-dimensional x-y plane including first and second lattice members 154, 170. The members 154, 170 are parallel and are attached or otherwise connected to a perpendicular receiving surface 172. The receiving surface 172 may be a third lattice member 154, the inside or outside surface 148, 150 of the inner wall 136 of the body 112, or other surface. A reinforcement link 174 of a predetermined radius r connects the first member 154 to the receiving surface 172 on at least one side 176 of the lattice member 154. A second reinforcement link 174 connects the second member 170 on at least one side 176 to the receiving surface 172. The reinforcement link 174 provides structural support and reinforcement to the lattice cell unit 169, and therefore to the lattice structure 152. FIG. 6B illustrates another arrangement of first and second lattice members 154, 170 and a reinforcement link 178 having a radius R that connects the first lattice member 154 to the receiving surface 172 and to the second parallel lattice member 170. The strength of the lattice structure 152 may vary according to the variable thickness of the reinforcement link 174, 178. The reinforcement link 178 in this case is an arc, but may be rectangular, or of another geometry.

Figure 6C:
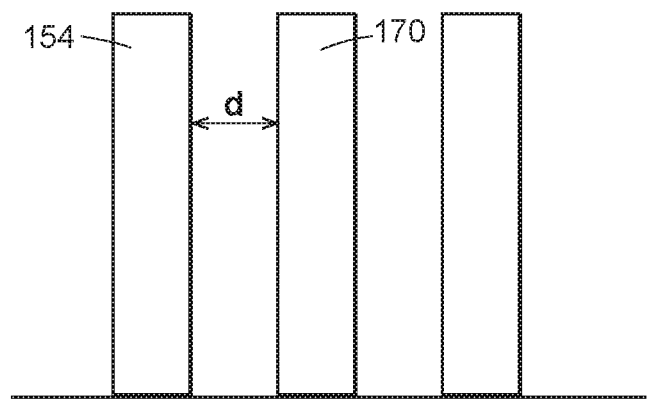
FIG. 6C illustrates an enlarged fragmentary cross-sectional view illustrating an exemplary arrangement of three lattice members assembled in accordance with the teachings described herein.

As illustrated in FIG. 6C, the lattice structure 152 may provide added structural support or strength by disposing the lattice members 154 closer together per lattice cell unit 169. The lattice member 154 is spaced a distance d from the second lattice member 170, which is less than a distance f between lattice members 154, 170 in FIG. 6B. By disposing the lattice members 154 at shorter distances, each lattice cell unit 169 increases in density. The lattice structure 152 may provide a first density in one area where the lattice members 154 are disposed a distance f, such as the lattice members 154, 170 of FIG. 6B, or the members 154 may be placed apart a distance d for a second and greater density. Shorter distances between lattice members 154 and reinforcement members 174, 178 may alleviate stress risers and provide added support to those areas of the body 112. The design of the lattice structure 152 may be adjusted and customized by adjusting the three-dimensional model of the body 112 in order to provide lattice cell units 169 having varying lattice member thickness, length, disposed at varying distances, connected at varying angles, and supported by different reinforcement links 174, 178. Additionally, the lattice cell unit 169 may be cubic, trinclinic, monoclinic, orthorhombic, tetragonal, rhombohedral, or hexagonal.

In a preferred method, the body 112 may be manufactured by AM with a lattice structure 152 as an integral piece. For example, a method manufacturing a body 112 as described and illustrated herein, may include forming an inner wall 136 having an outside surface 150 and an inside surface 148, an area 138 surrounding an inlet 120, an area 140 surrounding an outlet 122, and an area 142 surrounding a fluid flow path 118, wherein the inner wall 136 provides a fluid boundary and connects the inlet 120 and the outlet 122. The method may further include forming a portion 146 of the inner wall 136 that receives a valve seat, forming a portion 143 of the inner wall that receives a control stem and a control element, and forming a lattice structure 152. Forming the lattice structure 152 may include depositing a solidifiable material onto the inner wall 136 in a predetermined pattern, wherein the lattice structure 152 is three-dimensional and includes a plurality of connected lattice members 154. The lattice structure 152 as illustrated in FIGS. 2-5 may be formed by directly depositing the solidifiable material directly on the outside surface 150 of the inner wall 136 (FIG. 2), the inside surface 148 of the inner wall 136 (FIG. 3), or to the inner wall 136 within the hollow space 162 of the shell 160 (FIG. 4A-4B). The solidifiable material may be a fine powder of metal, composite, or polymer that bonds with other deposited layers by sintering or other suitable methods.

To reduce the weight of a valve body or regulator body, the method may further including performing a FEA to minimize the amount of the material, to optimize the use of risers or support structures in critical areas of the body 112, and the use of lighter materials. In addition to providing a lighter body 112, a lattice structure 152 may provide structural support by redistributing stress in the body 112. An FEA of the body 112 may help effectively optimize the use of a lattice structure 152 in the body 112 and to effectively design a lattice structure 152 for a particular location in the body 112. Results from the FEA may identify areas of the body 112 that are subject to substantial stress, pressure, force, or other measurable material properties. Similarly, areas that do not provide support or that do not require material properties related to strength can be identified. According to the results of the FEA, a designer may determine which areas of the body that can be replaced with a lattice structure 152. More specifically, the designer may design a lattice structure 152 that distributes stress, supports the inner wall 136, and reduces overall body weight to be implemented in the body 112. For example, a FEA may determine that certain areas of the body 112 do not require a particular strength inherent in a body 112 of a certain thickness and material. Once that area is determined, a three-dimensional model of the body 112 and lattice structure 152 designed particularly for that localized area may be provided. In another example, the inner wall 136 of the body 112 may be manufactured using conventional processes, and then milled or otherwise shaped to provide a receiving surface 172 for the lattice structure 152.

The lattice structure 152 may be attached to the inner wall 136 by welding, bonding, or other suitable means, or it may be manufactured directly onto a surface of the inner wall 136 by AM. As illustrated in FIGS. 2-4B, the lattice structure 152 may be attached or otherwise printed on the inside surface 148, outside surface 150, or on the first and second inside surfaces 164, 166 of the hollow shell 160. The lattice structure 152 may be formed by depositing the solidifiable material on a receiving surface, removing the lattice structure 152 from the receiving surface, and attaching the lattice structure to the inner wall 136. The body 112 may be manufactured as a single three-dimensional integrated body 112 or may be manufactured as separate parts and then combined to form a single body. The inner wall 136 may be first casted using known methods and then the lattice structure 152 may then be attached to the inner wall. The body 112 illustrated and described herein may be adapted and configured to couple to or otherwise connect to other parts of a control valve or fluid regulator.

The lattice structure 152 may form various shapes, densities, and strengths to suit the needs of the body 112. The lattice structure 152 may be a first material and the inner wall 136 may be a second material. The body 112 may be made of one or multiple materials based on the needs of the body 112, such as strength, flexibility, insulation, etc., and may be partially manufactured by conventional methods and/or by additive manufacturing. The inner wall 136 and the lattice structure 152 may be the same or different materials. For example, the inner wall 136 may be a material that is resistant to the process fluid, and the lattice structure 152 may be a different material than the inner wall 136 that provides strength. The lattice structure 152 may be a permeable, non permeable, and/or may have a varying shapes and lattice structure formations. The air pockets of the lattice structure 152 may be sealed with an inert gas, gel, or fluid for insulation or to prevent chemicals from the process to leak through the inner wall 136 and break down the body 112. A sensor may be placed within the lattice structure 152 to detect leaks or vibrations in the inner wall 136. The sensor may be configured to direct flow away from an inner wall break or in a particular manner. The sensor may also remove, reduce, or otherwise change temperature of the process fluid.

Upon reading the disclosure above, those skilled in the art would understand that conventional methods of manufacturing a body component of fluid control systems may only provide a body with uniform density, providing strength by forming thick walls of a single suitable material. Incorporating a lattice structure formed by Additive Manufacturing deviates from current practice because the design of the body drives the process of manufacturing, rather than the process driving the design. The lattice structure may be designed having a shape and structure capable of redistributing the stress of the body and providing additional structural support. For bodies incorporating a lattice structure as part of the inner wall of sizes 6" or larger, the body may be significantly be lighter in weight than a body manufactured by conventional methods.

Additionally, the skilled person would understand that AM may utilize any number three-dimensional printers or AM machines that are available and that are suitable for making and designing a regulator body or a valve body in accordance with the present disclosure. Additive Manufacturing enables a design-driven manufacturing process such that the body components of fluid control systems are manufactured based on the design requirements, and not based on the restriction and limited capabilities of manufacturing methods. AM affords design flexibility, integration of new materials and structures, and customization of body components. AM may be used for designing light, stable, customizable and complex structures, thereby saving a manufacturer costs related to labor and materials associated with finishing processes. Additive manufacturing allows each valve body to be customized according to the requirements of the process for which it is used.

What is claimed is:

1. A method of manufacturing a body of a fluid control apparatus using additive manufacturing, the method including:
forming an inner wall having an outside surface and an inside surface, an area surrounding an inlet, an area surrounding an outlet, and an area surrounding a fluid flow path, wherein the inner wall provides a fluid boundary and connects the inlet and the outlet;
forming a portion of the inner wall that receives a valve seat;
forming a portion of the inner wall that surrounds a bore and receives a control stem and a control element;
forming a three-dimensional lattice structure by depositing a solidifiable material onto the inner wall in a predetermined pattern, wherein the lattice structure includes a plurality of connected lattice members.

2. The method of claim 1, wherein depositing the solidifable material includes depositing the solidifiable material directly onto the inside surface of the inner wall.

3. The method of claim 1, wherein depositing the solidifable material includes depositing the solidifable material directly onto the outside surface of the inner wall.

4. The method of claim 1, wherein forming the inner wall includes the of step forming a hollow space between the outside surface and the inside surface of the inner wall.

5. The method of claim 4, wherein forming the lattice structure includes depositing a solidifiable material onto the inner wall within the hollow space.

6. The method of claim 1, further including the step of identifying a material property of a localized area of the inner wall, and providing the lattice structure to the localized area, wherein the lattice structure includes the material property of the localized area.

7. The method of claim 6, wherein the material property is a material strength requirement.

8. The method of claim 1, further including the step of reinforcing the lattice structure by providing at least one link between at least two of the plurality of lattice members.

9. The method of claim 1, wherein the step of forming the lattice structure includes connecting the plurality of connected lattice members a predetermined distance apart to achieve a predetermined density of the lattice structure.

10. A method of manufacturing a body of a fluid control apparatus, the method including:
forming an inner wall having an inside surface and an outside surface;
forming a portion of the inner wall arranged to receive a valve seat;
forming a first flange surrounding an inlet, a second flange surrounding an outlet, and a portion surrounding a fluid flow path connecting the inlet and the outlet;
forming a portion of the inner wall surrounding a bore that receives a control element and a valve stem; and forming a lattice structure having a plurality of connected lattice members, wherein the lattice structure is attached to the inner wall.

11. The method of claim 10, including forming the lattice structure on a receiving surface, removing the lattice structure from the receiving surface, and attaching the lattice structure to the inner wall.

12. The method of claim 10, wherein forming the inner wall includes forming the inner wall and the lattice structure together by depositing a solidifiable material in multiple layers according to a predetermined design to create a three-dimensional integrated body.

13. The method of claim 10, wherein forming the lattice structure includes manufacturing the lattice structure and attaching the lattice structure to the inside surface of the inner wall to modify the fluid flow path.

14. The method of claim 10, wherein forming the lattice structure includes manufacturing the lattice structure and attaching the lattice structure to the outside surface of the inner wall.

15. The method of claim 10, further including the step of providing a nonporous material for the inner wall and a porous material for the lattice structure.

16. The method of claim 10, further including the step of providing a gel, gas, or fluid disposed within the lattice structure for insulation.

17. The method of claim 10, further including the step of providing a sensor disposed within the lattice structure for sensing a leak in the inner wall.

18. The method of claim 10, further including the step of providing a housing arranged to receive an actuator assembly and a diaphragm assembly, wherein the housing is configured to attach to the inner wall.

* * * * *